(12) United States Patent
Bruchertseifer et al.

(10) Patent No.: US 9,284,458 B2
(45) Date of Patent: Mar. 15, 2016

(54) SILICONE BACKBONE PREPOLYMERS FOR FLAME RESISTANT POLYURETHANES

(75) Inventors: Christian Bruchertseifer, Tecklenburg (DE); Mark T. Anater, Marietta, GA (US)

(73) Assignee: Dow Global Technologies LLC, Midland, MI (US)

( * ) Notice: Subject to any disclaimer, the term of this patent is extended or adjusted under 35 U.S.C. 154(b) by 144 days.

(21) Appl. No.: 14/119,095

(22) PCT Filed: Jun. 14, 2012

(86) PCT No.: PCT/US2012/042403
§ 371 (c)(1),
(2), (4) Date: Nov. 20, 2013

(87) PCT Pub. No.: WO2013/003054
PCT Pub. Date: Jan. 3, 2013

(65) Prior Publication Data
US 2014/0113991 A1    Apr. 24, 2014

Related U.S. Application Data

(60) Provisional application No. 61/503,372, filed on Jun. 30, 2011.

(51) Int. Cl.
| | | |
|---|---|---|
| *C09K 21/06* | (2006.01) | |
| *C09D 5/18* | (2006.01) | |
| *C08G 18/50* | (2006.01) | |
| *C09D 175/04* | (2006.01) | |
| *C08G 18/12* | (2006.01) | |
| *C08G 18/32* | (2006.01) | |
| *C08G 18/40* | (2006.01) | |
| C08K 3/00 | (2006.01) | |
| C08K 3/04 | (2006.01) | |
| C08K 3/36 | (2006.01) | |

(52) U.S. Cl.
CPC .............. *C09D 5/185* (2013.01); *C08G 18/12* (2013.01); *C08G 18/324* (2013.01); *C08G 18/3206* (2013.01); *C08G 18/4009* (2013.01); *C08G 18/5096* (2013.01); *C09D 175/04* (2013.01); *C08K 3/0033* (2013.01); *C08K 3/04* (2013.01); *C08K 3/36* (2013.01)

(58) Field of Classification Search
CPC .. C09D 5/185; C09D 175/04; C08G 18/5096; C08G 3/36; C08G 18/12; C08G 18/3206; C08G 18/324; C08G 18/4009; C08K 3/003; C08K 3/04
See application file for complete search history.

(56) References Cited

U.S. PATENT DOCUMENTS

| | | |
|---|---|---|
| 4,246,146 A | 1/1981 | Wood et al. |
| 4,482,662 A | 11/1984 | Rapaport et al. |
| 5,151,216 A | 9/1992 | Liu |
| 5,196,459 A | 3/1993 | Smrt et al. |
| 6,638,319 B2 | 10/2003 | Sanduja et al. |

FOREIGN PATENT DOCUMENTS

| | | |
|---|---|---|
| EP | 1621564 A1 | 2/2006 |
| JP | 2002293969 A | 10/2002 |
| WO | 2012051135 A1 | 4/2012 |

OTHER PUBLICATIONS

PCT/US2012/042403 International Search Report & Written Opinion.
PCT/US2012/042403 International Preliminary Report on Patentability.

*Primary Examiner* — Kriellion Sanders
*Assistant Examiner* — Kuo-Liang Peng

(57) ABSTRACT

Embodiments of the invention provide for coatings that include the reaction product of at least a sodium silicate solution, at least one isocyanate reactive component having at least one of a hydroxyl and an amine functionality of between about 2 and about 4, at least one intumescent filler, at least one filler, optionally a suspension agent and at least one prepolymer having isocyanate functional groups. The prepolymer includes the reaction product of a prepolymer reaction mixture. The prepolymer reaction mixture includes at least one isocyanate, at least one polyol having an hydroxyl functionality of between about 2 and about 6, and at least one silicone surfactant having at least one isocyanate reactive moiety.

10 Claims, No Drawings

SILICONE BACKBONE PREPOLYMERS FOR FLAME RESISTANT POLYURETHANES

FIELD OF THE INVENTION

Embodiments of the invention relate to polyurethanes, more specifically to polyurethane coatings that have improved flame resistance.

BACKGROUND OF THE INVENTION

Polyurethane elastomeric coatings are well-established in industrial applications where a tough, durable protection is required. Examples include roof membranes, waterproofing for building foundations, bridge decking, water and sewage pipes, truck bed liners and secondary containment. Carriers for liquid natural, propylene or ethylene, gas also require a thermal insulation which is typically achieved by the application of sprayable rigid polyurethane foam, then on top of the thermal insulation, due to the high flammability of the carried gas, a fire retardant sprayable membrane is applied. Other applications have emerged which also require flame resistance due to building codes or legal liability issues. These include architectural, mining, shipping and transportation applications. Polyurethane chemistry is not inherently resistant to flame, and thus requires additives to improve this characteristic. Historically the approaches have included halogenated materials, phosphorus containing compounds (phosphates, phosphonates), inorganic fillers, char promoters, intumescent additives and hybrid chemistries using other functional groups such as isocyanurate and oxazolidone. However, the efficiency of these approaches is limited in coatings. Therefore, there is a need for polyurethane elastomeric coatings that have improved flame resistance.

SUMMARY OF THE INVENTION

Embodiments of the invention provide for coatings that include the reaction product of at least a sodium silicate solution, at least one isocyanate reactive component having at least one of a hydroxyl and an amine functionality of between about 2 and about 4, at least one intumescent filler, at least one filler, optionally a suspension agent and at least one prepolymer having isocyanate functional groups. The prepolymer includes the reaction product of a prepolymer reaction mixture. The prepolymer reaction mixture includes at least one isocyanate, at least one polyol having an hydroxyl functionality of between about 2 and about 6, and at least one silicone surfactant having at least one isocyanate reactive moiety.

Embodiments include a coating including the reaction product of a reaction system.
The reaction system includes:
  at least one prepolymer having isocyanate functional groups;
  a sodium silicate solution
  at least one isocyanate reactive component having at least one of a hydroxyl and an amine functionality of between about 2 and about 4;
  at least one intumescent filler;
  at least one filler; and
  optionally a suspension agent.
The prepolymer having isocyanate functional groups includes the reaction product of a prepolymer reaction mixture including:
  at least one isocyanate;
  at least one polyol having an hydroxyl functionality of between about 2 and about 6; and
  at least one silicone surfactant having at least one isocyanate reactive moiety Embodiments of the invention also provide for methods of producing a coating, which includes:
reacting a reaction system, the reacting system including:
  at least one prepolymer having isocyanate functional groups, wherein the prepolymer includes the reaction product of a prepolymer reaction mixture comprising:
    at least one isocyanate;
    at least one polyol having an hydroxyl functionality of between about 2 and about 6; and
    at least one silicone surfactant having at least one isocyanate reactive moiety;
  a sodium silicate solution
  at least one isocyanate reactive component having at least one of a hydroxyl and an amine functionality of between about 2 and about 4;
  at least one intumescent filler;
  at least one filler; and
  optionally a suspension agent.

DESCRIPTION OF EMBODIMENTS OF THE INVENTION

Embodiments of the invention provide for polyurethane elastomeric coatings that have improved flame resistance. The embodiments combine a polyurethane prepolymer (which includes a reaction product of at least one isocyanate, at least one silicone surfactant, and at least one polyol) and a mixture of inorganic fillers, intumescent fillers, chain extenders, catalysts, and aqueous silicic acid sodium salt solutions known commonly as waterglass. When mixed, the components cure and form a finished article which has enhanced resistance to flame. Whereas an ordinary polyurethane article may not self-extinguish after just a few seconds of flame exposure, the embodiments of the invention may self-extinguish after several minutes of exposure. Heat release and smoke release rates are also lower for the embodiments of the invention compared to a conventional polyurethane formula.

The polyurethane prepolymer may be the reaction product of at least one isocyanate, at least one silicone surfactant, and at least one polyol. Suitable isocyanates for use in preparing the prepolymer include a wide variety of organic mono- and polyisocyanates. Suitable monoisocyanates include benzyl isocyanate, toluene isocyanate, phenyl isocyanate and alkyl isocyanates in which the alkyl group contains from 1 to 12 carbon atoms. Suitable polyisocyanates include aromatic, cycloaliphatic and aliphatic isocyanates. Exemplary polyisocyanates include m-phenylene diisocyanate, toluene-2-4-diisocyanate, toluene-2-6-diisocyanate, isophorone diisocyanate, 1,3- and/or 1,4-bis(isocyanatomethyl)cyclohexane (including cis- or trans-isomers of either), hexamethylene-1,6-diisocyanate, tetramethylene-1,4-diisocyanate, cyclohexane-1,4-diisocyanate, hexahydrotoluene diisocyanate, methylene bis(cyclohexaneisocyanate) ($H_{12}MDI$), naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. In some embodiments, the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-methylene diphenyl isocyanate, diphenylmethane-2,4'-diisocyanate and mixtures thereof are generically referred to as MDI, and all may be used. Toluene-2,4-diisocyanate, toluene-2,6-diisocyanate and mixtures thereof are generically referred to as TDI, and all may be used. In one embodiment, a 50 percent 4,4' MDI, 50 percent 2,4' MDI, such as ISONATE 50 OP available from The Dow Chemical Company, is used in combination with a polymeric MDI, such as PAPI 27 available from The Dow Chemical Company.

Derivatives of any of the foregoing isocyanate groups that contain biuret, urea, carbodiimide, allophonate and/or isocyanurate groups may also be used. These derivatives often have increased isocyanate functionalities and are desirably used when a more highly crosslinked product is desired.

The at least one isocyanate may be reacted with at least one silicone surfactant and at least one polyol to form a prepolymer. Any silicone based surfactant known in the art may be suitable as long as the silicone surfactant includes isocyanate reactive moieties, such as hydroxyl and amine groups. Embodiments encompass silicone surfactants having a hydroxyl number between about 30 and about 100 MgKOH/g and/or a hydroxyl functionality of between about 2 and about 4. In some embodiments the silicone surfactant includes at least a polydimethylsiloxane-polyalkyleneoxide. The polydimethylsiloxane-polyalkyleneoxide may be a complex reaction product of polydimethylsiloxane and polyalkyleneoxide and may be represented as in the following structure:

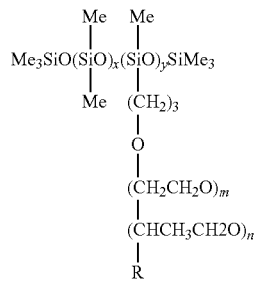

where x and y correspond to the average number of dimethylsiloxy and methylpolyethersiloxy groups per polymer chain respectively; m and n indicate the average number of polyethylene oxide and polypropylene oxide units. R is the polyether end-capping group. Suitable silicone surfactants include DABCO DC 193 (a 3200 mw siloxane with polyether chains and primary hydroxyl groups, OH number of 76, and a functionality of 2.4-2.5) and DABCO DC 5598 (a 9600 mw siloxane with polyether chains and secondary hydroxyl groups, OH number of 48, and a functionality 3.4) both available from Air Products and Chemicals, Inc.

Typically, the at least one silicone surfactant is included in an amount of from 2 to 30 weight % of the total weight of all the components included to make the prepolymer. All individual values and subranges between about 2 and about 30 weight % are included herein and disclosed herein; for example, the amount can be from a lower limit of about 2, 5, 7, 8, 9, 10, 11, 12, 15, 20, or 25 weight % to an upper limit of about 8, 9, 10, 11, 12, 15, 20, 25, or 30 weight %.

The isocyanate reactive moieties reacts with the isocyanate to form a silicone containing prepolymer "backbone." This silicone containing backbone helps enhance flame retardant properties in the resulting polyurethane products.

The at least one polyol may be any suitable polyol as is known in the art. For example, the polyol may comprise a polyester polyol, a polyether polyol, or combinations thereof.

As another example, the polyol may comprise an aliphatic polyol, a cycloaliphatic polyol, an aromatic polyol, a heterocyclic polyol, or combinations thereof. As yet another example, the polyol may comprise a sucrose polyol, a sucrose/glycerine polyol, a trimethylolpropane polyol, or combinations thereof.

The at least one polyol may have a nominal functionality of from 2-8. Typically, the polyol has a nominal functionality of from 2 to 4. Typically, the polyol has an OH value of from 25 to 800, such as from 25 to 600, or from 50 to 570 mg KOH/g. Additionally, the polyol may have a number average molecular weight of between about 150 and about 5000 or between about 200 and about 2000.

In one embodiment, the at least one polyol is a propylene glycol initiated polyoxypropylene diol having a number average molecular weight of 2000.

Typically, the at least one polyol is included in an amount of from 0 to 70 weight % of the total weight of all the components included to make the prepolymer. All individual values and subranges between about 0 and about 70 weight % are included herein and disclosed herein; for example, the amount can be from a lower limit of about 0, 5, 10, 15, 20, 25, 30, 35, 40, or 45 to an upper limit of about 15, 20, 25, 30, 35, 40, 45, 50, 55, 60, 65, or 70 weight %.

Reaction of the polyol and the silicone surfactant with the isocyanate can be catalyzed using at least one catalyst within the skill in the art for such reactions. Examples of urethane catalysts include tertiary amines such as triethylamine, 1,4-diazabicyclo[2.2.2.]octane (DABCO), N-methylmorpholine, N-ethylmorpholine, N,N,N',N'-tetramethylhexamethylenediamine, 1,2-dimethylimidazol; and tin compounds such as tin(II)acetate, tin(II)octanoate, tin(II)laurate, dibutyltin dilaurate, dibutyltin dimaleate, dioctyltin diacetate and dibutyltin dichloride. In one embodiment the catalyst is benzoyl chloride. The catalysts are optionally used alone or as mixtures thereof. The reaction may be heated to temperatures between 20° C. and 100° C., and may take 2-6 hours to complete.

The proportions of the isocyanate, silicone surfactant, and the polyol composition are chosen to provide an isocyanate terminated prepolymer product. This can be accomplished by using excess stoichiometric amount of polyisocyanate, that is, more than one isocyanate group per active hydrogen group the polyol compositions: The ratio of isocyanate groups to active hydrogen, preferably hydroxyl and amine groups, on polyol composition is preferably at least about 1.0, 1.2. 1.4, 1.5, 1.7, or 1.8, and independently preferably at most about 10, preferably at most about 6, preferably at most about 3. Higher (that is stoichiometric amounts or excess) isocyanate levels are optionally used.

The prepolymer is reacted in a reaction system that includes the prepolymer and at least one isocyanate reactive component, at least one sodium silicate solution, at least one filler, at least one intumescent filler, and optionally, at least one suspension agent. Other components such as surfactants, catalysts, preservatives, and antioxidants may be included as well.

The at least one isocyanate reactive component is a material having at least two isocyanate-reactive groups per molecule and an equivalent weight per isocyanate-reactive group of less than 400, such as less than 300, or in the range of 31-125 daltons. Representative of suitable isocyanate reactive components include polyhydric alcohols, aliphatic or aromatic diamines including polyoxyalkylenediamines, and mixtures thereof. The isocyanate reactive groups are preferably hydroxyl, primary aliphatic amine or secondary aliphatic amine groups. The isocyanate reactive components may be aromatic, aliphatic or cycloaliphatic, and are exemplified by triols, tetraols, diamines, triamines, aminoalcohols, and the like. Representative chain extenders include ethylene glycol, diethylene glycol, 1,3-propane diol, 1,3- or 1,4-butanediol, dipropylene glycol, 1,2- and 2,3-butylene glycol, 1,6-hexanediol, neopentylglycol, tripropylene glycol, 1,2-ethylhexyldiol, ethylene diamine, 1,4-butylenediamine, 1,6-hexamethylenediamine, 1,5-pentanediol, 1,6-hexanediol, 1,3-cyclohexandiol, 1,4-cyclohexanediol; 1,3-cyclohexane dimethanol, 1,4-cyclohexane dimethanol, N-methylethanolamine, N-methyliso-propylamine, 4-aminocyclohexanol, 1,2-diaminotheane, 1,3-diaminopropane, hexylmethylene diamine, methylene bis(aminocyclohexane), isophorone diamine, 1,3- or 1,4-bis(aminomethyl)cyclohexane, diethylenetriamine, 3,5-diethyltoluene-2,4-diamine and 3,5-diethyltoluene-2,6-diamine, and mixtures or blends thereof. Suitable primary diamines include for example dimethylthiotoluenediamine (DMTDA) such as Ethacure 300 from Albermarle Corporation, diethyltoluenediamine (DETDA) such as Ethacure 100 Ethacure from Albermarle (a mixture of 3,5-diethyltoluene-2,4-diamine and 3,5-diethyltoluene-2,6-diamine), isophorone diamine (IPDA), and dimethylthiotoluenediamine (DMTDA).

Between about 1 and about 35 parts per weight of the reaction system excluding the prepolymer may include at least one isocyanate reactive component. All individual values and subranges between about 1 and about 35 parts per weight are included herein and disclosed herein; for example, the amount can be from a lower limit of about 1, 2, 5, 10, 15, 20, or 25 parts by weight to an upper limit of about 7, 10, 15, 20, 25, 30, or 35 parts by weight.

The at least one sodium silicate solution, or waterglass as it is also known, is a versatile, inorganic chemical made by combining various ratios of silica and soda ash (sodium carbonate) at high temperature and dissolving the resulting sodium silicate in a solvent, such as for example water. Weight ratios of $SiO_2/Na_2O$ may be between about 1.4/1 to about 3.5/1, or between about 1.6/1 to about 3.22/1. The solutions may have sodium silicate concentrations of between about 5% and about 75% by weight. All individual values and subranges between about 5 and about 5% by weight are included herein and disclosed herein; for example, the concentration can be from a lower limit of about 5, 10, 15, 20, 25, 30, or 35% by weight to an upper limit of about 20, 25, 30, 35, 40, 45, 50, 55, 60, 65, 70, or 75% by weight. Suitable sodium silicate solutions are available from, for example, PQ Corporation under the trade designations A1647, A2445, A2447, A2645, BJ120, BW50, CRYSTAL, D, E, K, M, N, NClear, N38, O, OW, RU, SS, SS22, SS75, STAR, STIXSORR, and V. Between about 10 and about 70 parts per weight of the reaction system excluding the prepolymer may include the sodium silicate solution. All individual values and subranges between about 10 and about 70 parts per weight are included herein and disclosed herein; for example, the amount can be from a lower limit of about 10, 15, 20, 25, 30, or 35 parts by weight to an upper limit of about 20, 25, 30, 35, 40, 45, 50, 55, 60, 65, or 70 parts by weight.

The at least one filler may include barium sulfate ($BaSO_4$), aluminum oxide ($Al_2O_3$), aluminum hydroxide ($Al(OH)_3$), magnesium hydroxide ($Mg(OH)_2$) calcium carbonate ($CaCO_3$) mica, and talc. Between about 5 and about 50 parts per weight of the reaction system excluding the prepolymer may include the filler. All individual values and subranges between about 5 and about 50 parts by weight are included herein and disclosed herein; for example, the amount can be from a lower limit of about 5, 10, 15, 20, 25, 30, 35 parts by weight to an upper limit of about 20, 25, 30, 35, 40, 45, or 50 parts by weight.

The at least one intumescent filler may include expandable graphite or melamine. Suitable expandable graphite is available from, for example, Nyacol Inc. under the trade designation NYAGRAPH. Between about 2 and about 45 parts per weight of the reaction system excluding the prepolymer may include the intumescent filler. All individual values and subranges between about 2 and about 50 parts per weight are included herein and disclosed herein; for example, the amount can be from a lower limit of about 2, 5, 10, 15, 20, 25, 30, or 35 parts by weight to an upper limit of about 20, 25, 30, 35, 40, or 45 parts by weight.

The at least one optional suspension agent may include a thixotrope such as calcinated clay. Between about 2 and about 35 parts per weight of the reaction system excluding the prepolymer may include the suspension agent. All individual values and subranges between about 2 and about 35 parts per weight are included herein and disclosed herein; for example, the amount can be from a lower limit of about 2, 5, 10, 15, 20, 25, or 30 parts by weight to an upper limit of about 20, 25, 30, or 35 parts by weight.

The reaction system is then used to form a polyurethane product, such as for example a spray elastomer or coating. In one embodiment, a coating may be made by using plural component equipment which combines two components, an (a) component and a (b) component. The (a) component generally may include the isocyanate prepolymer and any other isocyanate functional materials, while the (b) component generally includes the rest of the components of the reaction system. Other additives may also be included in the resin blend component as noted previously.

The (a) component and (b) component are placed in two separate feeder tanks with optional heating capability. The materials are transferred via pumps to a metering system set to feed the materials at a predetermined volume ratio. The predetermined volume ratio may be between about 5:1 and about 1:5. In an embodiment, it is 1:1. At the application point the components are mixed via static or dynamic action and applied onto a substrate at 200-400 psi with optional air assist.

Embodiments of the invention include polyurethane spray elastomer systems where plural component, high pressure, high temperature spray equipment is used. The (a) component and the (b) component of the polyurethane spray elastomer systems may be combined or mixed under high pressure. In an embodiment, they are impingement mixed directly in the high-pressure spray equipment. This equipment includes, for example: an Isotherm PSM 700 plural component metering system and SP 300H gun at 100-240° F., 100-200 bar and a #3 or #4 mixing module. The two components are mixed in a mixing chamber under high pressure inside the spray gun and both reactants are undergoing a turbulent, laminar mix process which yields the reaction mixture which is then applied to the desired substrate via the spray gun. The coating/lining system is formed when the reacting mixture hits the substrate and wets it out to form a coherent coating or lining. The use of plural component spray equipment, however, is not critical to the present invention and is included only as one example of a suitable method for mixing the spray elastomers of the embodiments of the present invention.

EXAMPLES

The following examples are provided to illustrate the embodiments of the invention, but are not intended to limit the scope thereof. All parts and percentages are by weight unless otherwise indicated.

The following materials were used:

| | |
|---|---|
| BENTONE SD-1 | An organic derivative of a bentonite clay from Elementis Specialties, Inc. |
| Benzoyl chloride | Benzoyl chloride from Sigma Aldrich. |
| BYK W 961 | A dispersive agent from BYK Additives. |
| CRYSTAL 0265 | 44.6% solution of sodium silicate (silicic acid sodium salt) in water, 2.65 ratio of silica to sodium hydroxide (2.65 $SiO_2 \cdot Na_2O$) from PQ Corporation. |
| DABCO DC 193 | A 3200 mw siloxane with polyether chains and primary hydroxyl groups, OH number of 76, and a functionality of 2.4-2.5. Available from Air Products and Chemicals, Inc. |
| DABCO DC 5598 | A 9600 mw siloxane with polyether chains and secondary hydroxyl groups, OH number of 48, and a functionality 3.4. Available from Air Products and Chemicals, Inc. |
| DETDA | Diethyltoluenediamine (DETDA) from Albemarle. |
| ES 350 F5 | Expandable graphite flakes from Graphit Kropfmühl (GK). |
| FOMREZ UL 38 | A dibutyltindilaurate from Momentive Performance Chemicals |
| Glycerin | A crosslinker from Uniquema/Croda. |
| ISONATE* 143L | A polycarbodiimide-modified diphenylmethane diisocyanate, available from The Dow Chemical Company. |
| ISONATE* 30 OP | A 32.5% percent 4,4'-methylene diphenyl isocyanate, 67.5% percent 2,4'-methylene diphenyl isocyanate mixture having a functionality of 2.0 and an equivalent weight of 125 g/equivalent available from The Dow Chemical Company. |
| ISONATE* 50 OP | A 50 percent 4,4'-methylene diphenyl isocyanate, 50 percent 2,4'-methylene diphenyl isocyanate mixture having a functionality of 2.0 and an equivalent weight of 125 g/equivalent available from The Dow Chemical Company. |
| JEFFCAT DMDEE | Bis(2.2-morpholinoethyl)ether from Huntsman International LLC. |
| MARTINAL ON 320 | An alumina trihydride, $Al_2O_3 \cdot 3H_2O$ available from Albemarle. |
| MARTINAL ON 4608 | An alumina trihydride, $Al_2O_3 \cdot 3H_2O$ available from Albemarle. |
| MARTINAL ON 908 | An alumina trihydride, $Al_2O_3 \cdot 3H_2O$ available from Albemarle. |
| NANOFIL 116 | A natural montmorillonite alumosilicate from Southern Clay Products, Inc. |
| PHT-4 Diol | 1.2-Benzenedicarboxylic acid. 3,4,5,6-tetrabromo-, mixed esters with diethylene glycol and propylene glycol from Air Products. |
| SYLOSIV A 300 | A molecular sieve powder from W. R. Grace & Co. |
| TCPP | Trichloro propylphosphate, available from ICL Industrial Products B.V. |
| TEGOSTAB 8738 LF2 | A silicone stabilizer from Evonik Industries. |
| VORANATE* M 220 | A low viscosity polymethylene polyphenylisocyanate of high reactivity, an average molecular weight of 340-380, a total isocyanate content of about 31%, and an average functionality of 2.7. |
| VORANATE* M 229 | A polymeric methylene diphenylenediisocyanate available from The Dow Chemical Company |
| VORANOL* 2000 L | A propylene glycol initiated polyoxypropylene diol having a 2000 molecular weight from The Dow Chemical Company. |

*ISONATE, VORANATE, and VORANOL are trademarks of The Dow Chemical Company.

Polyol 1 and 2:

CRYSTAL 0265, TEGOSTAB 8738 LF2 (Polyol 1), DABCO DC 193 (Polyol 1), DETDA, glycerin, BYK W 961 (Polyol 1), FOMREZ UL 38 (Polyol 2), and JEFFCAT DMDEE (Polyol 2) are added to a mixing vessel at ambient temperature, and mixed to combine. SYLOSIV A 300, MARTINAL ON 320 (Polyol 1), MARTINAL ON 4608 (Polyol 1), MARTINAL ON 908 (Polyol 2), NANOFIL 116 (Polyol 1), and BENTONE SD 1 (Polyol 2) are added and mixed until the blend is homogeneous and all particles are fully incorporated. ES 350 F5 is added and mixed carefully under low shear to avoid damaging the flakes until all particles are fully incorporated and dispersed evenly. The amounts in weight percent is given in Table 1

TABLE 1

| | Polyol 1 | Polyol 2 |
|---|---|---|
| DETDA | 6.0 | 5.0 |
| Glycerin | 3.0 | 5.0 |
| DABCO DC 193 | 3.0 | — |
| CRYSTAL 0265 | 47.9 | 47.9 |
| MARTINAL ON 320 | 14.3 | — |

TABLE 1-continued

| | Polyol 1 | Polyol 2 |
|---|---|---|
| MARTINAL ON 4608 | 6.2 | — |
| MARTINAL ON 908 | — | 25.0 |
| NANOFIL 116 | 4.0 | — |
| BENTONE SD 1 | — | 2.0 |
| BYK W 961 | 0.3 | — |
| SYLOSIV | 2.0 | 2.0 |
| TEGOSTAB 8738 LF2 | 0.5 | — |
| ES 350 F5 | 11.0 | 15.0 |
| FOMREZ UL 38 | — | 0.05 |
| JEFFCAT DMDEE | — | 0.05 |

Prepolymer Components

Procedure for Comparative Prepolymer A

ISONATE OP 50 is added to a reactor vessel, and heated to 50° C. Then benzoyl chloride is added and VORANOL 2000 L is added at a controlled rate under agitation until all has been added. The reaction mixture is allowed to digest for about 3 hours and then checked for a target isocyanate concentration of 12.5 weight percent of the mixture according to ASTM D5155-10. PHT-4 Diol is added digested for about 1.5 hours, and the mixture checked for a target isocyanate concentration of 9.7 weight percent of the mixture. VORANATE M 220 is added and the mixture checked for a target isocyanate concentration of 11.0 weight percent of the mixture.

Procedure for Prepolymer 1

ISONATE OP 50 is added to a reactor vessel, and heated to 50° C. Then benzoyl chloride is added and a premix of VORANOL 2000 L and DABCO DC 193 is added at a controlled rate under agitation until all has been added. The reaction mixture is allowed to digest for about 3 hours and then checked for a target isocyanate concentration of 12.5 weight percent of the mixture. PHT TCPP is added digested for about 1.5 hours, and the mixture checked for a target isocyanate concentration of 9.7 weight percent of the mixture. VORANATE M 229 is added and the mixture checked for a target isocyanate concentration of 11.0 weight percent of the mixture.

TABLE 2

|  | Comparative Prepolymer A | Prepolymer 1 |
|---|---|---|
| ISONATE 50 OP | 35.2 | — |
| ISONATE M 143 | — | 32.8 |
| VORANATE M 220 | 9.1 | — |
| VORANATE M 229 | — | 10.9 |
| VORANOL 2000 L | 46.6 | 33.2 |
| PHT-4-Diol | 9.1 | — |
| Benzoyl Chloride | 0.01 | 0.02 |
| DABCO DC 193 | — | 11.1 |
| TCPP | — | 12.0 |

Application:

The Prepolymers and the Polyols are placed in two separate feeder tanks with an optional heating capability set to heat the Polyols to 40° C. and the Prepolymers to 60° C. The materials are transferred via pumps to a metering system set to feed the materials at a 1:1 volume ratio. At the application point the components are mixed via static action and applied onto a substrate at 200-400 psi with optional air assist to form a film having a target thickness of 2 mm.

Three films are made:

| Comparative 1 | Comparative 2 | Example 1 |
|---|---|---|
| Polyol 2/Comparative Prepolymer A | Polyol 1/Comparative Prepolymer A | Polyol 1/Prepolymer 1 |

UL 94 Test

The sample is placed in a fire test chamber and fixed in a metal frame. The flame from a Bunsen burner is applied at an angle of 45° to the narrow edge of the sample sheet according to DIN 4102 B1. The bottom edges of all sample sheets show charring and some material loss. During testing the graphite flakes expand and subsequently partially flake off. The materials show differences in the degree of material loss as well as resistance to deformation. While Comparative 1 shows relatively strong deformation with loss of material, Comparative 2 shows a more limited area of deformation and loss of material. However, the Example 1 membrane keeps its dimensional integrity better; suggesting a less plastic material when exposed to flame treatment.

Test with Welding Torch

The films are applied to blocks based on sprayable rigid foam having the dimensions 50×50×10 cm. For the flammability test, the sample is placed in a cylindric tube (140×75 cm) made either from ductile cast iron or steel (V2A). The tube has an opening for a chimney (90×22 cm) on top in order to determine the time when black smoke emission begins. The flame source is a welding torch placed through a rectangular opening (in the cylindric hood, 40×15 cm) perpendicular to the surface of the membrane on the sample. The distance of the opening to the sample is approximately 25 cm. Results are found in Table 3. It can be seen that the sample made using Prepolymer 1 has faster extinguishing times and smaller size of burn crater.

TABLE 3

|  | Comparative 1 Polyol 2/Comparative Prepolymer A | Comparative 2 Polyol 1/Comparative Prepolymer A | Example 1 Polyol 1/Prepolymer 1 |
|---|---|---|---|
| Screening test-20 seconds torching | | | |
| Extinguishing time [s] | 0 | 0 | 1 |
| Black smoke visble | no | no | no |
| Tube test-90 seconds torching | | | |
| extinguishing time [s] | 28 | 56 | 4 |
| black smoke dev. [s] | 60 | 40-50 | 85 |
| size of crater [cm] | 17-19 | 20-25 | 7 |

While the foregoing is directed to embodiments of the present invention, other and further embodiments of the invention may be devised without departing from the basic scope thereof, and the scope thereof is determined by the claims that follow.

The invention claimed is:

1. A coating comprising the reaction product of a reaction system, the reaction system comprising:
   at least one prepolymer having isocyanate functional groups, wherein the prepolymer comprises the reaction product of a prepolymer reaction mixture comprising:
      at least one isocyanate;
      at least one polyol having an hydroxyl functionality of between about 2 and about 6; and
      at least one silicone surfactant having at least one isocyanate reactive moiety;
   a sodium silicate solution
   at least one isocyanate reactive component having at least one of a hydroxyl and an amine functionality of between about 2 and about 4;
   at least one intumescent filler that is at least one of expandable graphite and melamine;
   at least one filler that is different from the intumescent filler; and
   optionally a suspension agent.

2. The coating of claim 1, wherein the at least one silicon surfactant has a hydroxyl number between about 30 and about 100 MgKOH/g and a hydroxyl functionality of between about 2 and about 4.

3. The coating of claim 2, wherein the at least one silicone surfactant comprise at least a polydimethylsiloxane-polyalkyleneoxide.

4. The coating of claim 2, wherein from 2 to 30 weight % of the prepolymer reaction mixture comprises the at least one silicone surfactant.

5. The coating of claim 4, wherein the sodium silicate solution has a weight ratio of $SiO_2/Na_2O$ of between about 1.4/1 and about 3.5/1.

6. The coating of claim 1, wherein the at least one isocyanate reactive component has an equivalent weight per isocyanate-reactive group of between about 31 and about 125 daltons.

7. The coating of claim 6, wherein the at least one filler that is different from the intumescent filler comprises at least one of barium sulfate ($BaSO_4$), aluminum oxide ($Al_2O_3$), aluminum hydroxide ($Al(OH)_3$), magnesium hydroxide ($Mg(OH)_2$) calcium carbonate ($CaCO_3$), mica, and talc.

8. The coating of claim 1, wherein the at least one optional suspension agent comprises calcinated clay.

9. The coating of claim 1, wherein the at least one isocyanate comprises at least one polymeric polymethylene polyphenylisocyanate and at least one mixture of 4,4'-methylene diphenyl isocyanate and 2,4'-methylene diphenyl isocyanate.

10. A method of producing a coating of claim 1, the method comprising:

reacting a reaction system, the reacting system comprising:
the at least one prepolymer having isocyanate functional groups, wherein the prepolymer comprises the reaction product of a prepolymer reaction mixture comprising:
the at least one isocyanate;
the at least one polyol having an hydroxyl functionality of between about 2 and about 6; and
the at least one silicone surfactant having at least one isocyanate reactive moiety;
the sodium silicate solution
the at least one isocyanate reactive component having at least one of a hydroxyl and an amine functionality of between about 2 and about 4;
the at least one intumescent filler;
the at least one filler; and
optionally the suspension agent.

* * * * *